United States Patent
Castelain

(10) Patent No.: US 7,058,115 B2
(45) Date of Patent: Jun. 6, 2006

(54) EQUALIZATION METHOD AND DEVICE OF THE GMMSE TYPE

(75) Inventor: Damien Castelain, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 631 days.

(21) Appl. No.: 10/097,007

(22) Filed: Mar. 14, 2002

(65) Prior Publication Data

US 2002/0181562 A1    Dec. 5, 2002

(30) Foreign Application Priority Data

Mar. 22, 2001    (FR)    ................................. 01 04050

(51) Int. Cl.
    *H04B 1/69*    (2006.01)
(52) U.S. Cl. ................... 375/147; 375/148; 370/335
(58) Field of Classification Search ............. 375/130, 375/136, 148, 349, 350, 140, 144, 147, 222, 375/260, 262, 316, 340, 341, 342, 345; 370/320, 370/335, 342, 441, 208, 209, 210, 328, 464, 370/465, 498, 503; 455/132, 500, 509, 512
    See application file for complete search history.

(56) References Cited

U.S. PATENT DOCUMENTS

| | | | |
|---|---|---|---|
| 6,075,792 A * | 6/2000 | Ozluturk | 370/441 |
| 6,175,588 B1 * | 1/2001 | Visotsky et al. | 375/148 |
| 6,201,799 B1 * | 3/2001 | Huang et al. | 370/342 |
| 6,240,099 B1 * | 5/2001 | Lim et al. | 370/441 |
| 6,301,293 B1 * | 10/2001 | Huang et al. | 375/130 |
| 6,654,408 B1 * | 11/2003 | Kadous et al. | 375/148 |
| 6,711,219 B1 * | 3/2004 | Thomas et al. | 375/346 |
| 6,792,033 B1 * | 9/2004 | Maruta et al. | 375/148 |
| 6,956,892 B1 * | 10/2005 | Ylitalo | 375/144 |
| 2003/0021249 A1 * | 1/2003 | Kim et al. | 370/335 |

OTHER PUBLICATIONS

Thomas P. Krauss, William J. Hillery and Michael D. Zoltowski, "MMSE equalisation for forward link in 3G CDMA: symbol-level versus chip-level", Aug. 14-16, 2000, IEEE, Statistical Signal and Array Processing, 2000. Proceedings of Workshop on, 18-22.*

* cited by examiner

*Primary Examiner*—Tesfaldet Bocure
*Assistant Examiner*—Naheed Ejaz
(74) *Attorney, Agent, or Firm*—Oblon, Spivak, McClelland, Maier & Neustadt, P.C.

(57) ABSTRACT

An equalization method and apparatus for a downlink channel in a telecommunication system transmitting MC-CDMA symbols on a plurality of carrier frequencies, in which a plurality of links are established between a transmitter and a plurality of receivers in order to transmit a plurality of coded signals, each link using a distinct access code amongst N possible codes, there being P links for P users where P is less than N. The equalization including the formation and use of a matrix of reduced size based upon the number of links being P by eliminating matrix elements relating to the unused codes and effecting an estimation of the said transmitted symbols according to a mean square error minimization criterion.

10 Claims, 6 Drawing Sheets

EQUALIZATION METHOD AND DEVICE OF THE GMMSE TYPE

FIELD OF THE INVENTION

The present invention concerns an equalization method and device for the downlink channel of a telecommunications system of the MC-CDMA type. More particularly, the present invention concerns an equalization method and device of the GMMSE type.

DESCRIPTION OF THE RELATED ART

Multi-Carrier Code Division Multiple Access (MC-CDMA) combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109–113, 1993. The developments of this technique were reviewed by S. Hara et al. in the article entitled "Overview of Multicarrier CDMA" published in IEEE Communication Magazine, pages 126–133, December 1997.

Unlike the DS-CDMA (Direct Sequence Code Division Multiple Access) method, in which the signal of each user is multiplied in the time domain in order to spread its frequency spectrum, the signature here multiplies the signal in the frequency domain, each element of the signature multiplying the signal of a different sub-carrier.

More precisely, FIG. 1 shows the structure of an MC-CDMA transmitter for a given user k. Let $d_k(i)$ be the $i^{th}$ symbol to be transmitted from the user k, where $d_k(i)$ belongs to the modulation alphabet. The symbol $d_k(i)$ is first of all multiplied at 110 by a spreading sequence or signature of the user, denoted $c_k(t)$, consisting of N "chips", each "chip" being of duration $T_c$, the total duration of the spreading sequence corresponding to a symbol period T. The results of the multiplication of the symbol $d_k(i)$ by the different "chips" are converted by the serial to parallel converter 120 into a block of L symbols, where L is in general a multiple of N. It will be considered, for reasons of simplification of presentation, that L=N. The block of L symbols is then subjected to an inverse fast Fourier transformation (IFFT) in the module 130 before being transmitted to the parallel to serial converter 140. In order to prevent intersymbol interference, a guard interval, with a length greater than the duration of the pulse-type response of the transmission channel, is added to the MC-CDMA symbol. This interval is obtained by the addition (not shown) of a suffix chosen so as to be identical to the start of the said symbol. The symbol thus obtained is amplified at 150 in order to be transmitted over the user channel. It can therefore be seen that the MC-CDMA method can be analysed into a spreading in the spectral domain (before IFFT) followed by an OFDM modulation.

In practice, a base station transmits the data for a user k in the form of frames of I symbols, each symbol $d_k(i)$ being spread by a real signature $c_k(t)$ with a duration equal to the symbol period T, such that $c_k(t)=0$ if $t \notin [0,T]$. The signal modulated at time $t=i.T+l.T_c$ can then be written, if the guard intervals between MC-CDMA symbols are omitted:

$$S_k(t) = \sum_{i=0}^{I-1} \sum_{l=0}^{L-1} v_k \cdot c_k(l \cdot T_c) \cdot d_k(i) \cdot \exp(j \cdot 2\pi l / L) \quad (1)$$

where $v_k$ is the amplitude of the signal transmitted by the user k, assumed to be constant for a transmission unit.

An MC-CDMA receiver for a given user k has been illustrated schematically in FIG. 2.

The demodulated received signal is sampled at the "chip" frequency and the samples belonging to the guard interval are eliminated (elimination not shown). The signal obtained can be written:

$$R(t) = \sum_{k=0}^{K-1} \sum_{i=0}^{I-1} \sum_{l=0}^{L-1} h_{kl}(i) \cdot v_k \cdot c_{kl} \cdot d_k(i) \cdot \exp(j \cdot 2\pi l / L) + b(t) \quad (2)$$

where K is the number of users, $c_{kl}=c_k(l.T_c)$, and where $h_{kl}(i)$ represents the response of the channel of the user k to the frequency of the sub-carrier l of the MC-CDMA symbol transmitted at time i.T and where b(t) is the received noise.

If the downlink channel is considered, the transmission channels have identical characteristics and it is possible to write $h_{kl}=h_l$. The study will be limited hereinafter to the downlink channel.

The samples obtained by sampling at the "chip" frequency are put in parallel in a serial to parallel converter 210 before undergoing an FFT in the module 220. The samples in the frequency domain, output from 220, are equalised and despread by the signature of the user k. To do this, the samples of the frequency domain are multiplied by the coefficients $q_l.c_{kl}^*$ in the multipliers $230_0, \ldots, 230_{L-1}$, and then added at 240 in order to supply an output symbol $\hat{d}_k(i)$.

Different possibilities of equalization have been envisaged in the state of the art:

MRC (Maximum Ratio Combining) defined by the use of the coefficients $q_l=h_l^*$ where.* denotes the complex conjugate;

EGC (Equal Gain Combining) defined by the use of the coefficients $q_l=e^{-j\Phi l}$ where $h_l=\rho_l.e^{j\Phi l}$;

ZF (Zero Forcing) where $q_l=h_l^{-1}(i)$;

zero forcing ZF with threshold (Th) where $q_l=h_l^{-1}(i)$; if $|h_l(i)|<Th$ and $q_l=0$ (or $q_l=e^{-j\Phi l}$) otherwise;

the Minimum Mean Square Error (MMSE) algorithm for minimising the mean square error on each of the carriers:

$$q_l = \frac{h_l^*}{|h_l|^2 + \sigma^2}$$

where $\sigma^2$ is the variance of the noise on the carrier.

In MC-CDMA, the presence of a guard period makes it possible to neglect the intersymbol interference. The equalization can therefore be effected simply by means of a simple multiplication by a complex coefficient, carrier by carrier.

The receiver illustrated in FIG. 2 decodes the data of a user k without taking account of the interference due to the other users. For this reason it is referred to as single user or SU.

Multiuser detection techniques are known, notably in CDMA telecommunications systems. They have the common characteristic of taking account of the interference generated by the other users.

A multiuser detection or MUD technique for MC-CDMA was presented in the article by J-Y. Beaudais, J. F. Hlard and J. Citerne entitled "A novel linear MMSE detection technique for MC-CDMA" published in Electronics Letters, Vol. 36, No. 7, pages 665–666, Mar. 30, 2000. The equalization method proposed no longer operates carrier by carrier but MC-CDMA symbol by MC-CDMA symbol, taking account of all the carriers. It is for this reason also referred to as GMMSE (Global Minimum Mean Square Error) or, equivalently, M-MMSE (Matrix Minimum Mean Square Error) equalization. Its purpose is to minimize the mean square error between the estimated symbols $\hat{d}_k(i)$ and the transmitted symbols $d_k(i)$.

An MC-CDMA receiver with GMMSE equalization for a user k (also referred to in this case as per user MMSE) has been depicted in FIG. 3. It differs from that of FIG. 2 in that the equalization is effected by means of a multiplication 331 by a matrix Q of the signals of the different carriers. After despreading by multiplication at $332_0, \ldots, 332_{L-1}$ with the signature of the user k and adding at 340, the signal obtained is multiplied at 360 by the transmission level $v_k$ relating to the user k in order to supply an estimated symbol $\hat{d}$ (the time index i will be omitted for reasons of simplification).

An MC-CDMA receiver with GMMSE equalization, estimating the symbols $d_k$ transmitted to the different users, has been depicted in FIG. 4. The modules 410, 420 and 431 are identical to the modules 310, 320 and 331. The despreading is effected at 432, by means of the multiplication by the matrix $C^H$ where C is the matrix of the N possible codes ($.^H$ designates the conjugate transpose). More precisely, the matrix C is the matrix whose columns consist of the N possible codes $c_k$, k=0, ..., N−1, each code $c_k$ being a vector whose components form the sequence $c_{jk}$. The output vector of 432 is subjected to a multiplication at 433 by the matrix $V^H$ where $V=\text{Diag}(v_0, \ldots, v_{N-1})$ is the diagonal matrix representing the amplitudes $v_k$ of the signals transmitted by the base station to the N possible users. When the base station serves fewer than N users, or in other words when the system is not working at full load, the transmission levels corresponding to the unused codes are zero.

The MC-CDMA signal output from the FFT step, 420, can be written in the form of a vector Y of dimension N whose components correspond to the different carriers. Taking the above notations, Y can be expressed as a function of the vector D of the symbols $d_k$ transmitted to the different users:

$$Y = HCVD + b = AD + b \tag{3}$$

where A=HCV and where b is the vector of the noise components.

The diagonal matrix H represents the frequency response of the channel to the different subcarriers, that is to say $H=\text{Diag}(h_0, h_1, \ldots, h_{N-1})$.

The vector Y is an observable from which it is possible to estimate the vector D by Wiener filtering. If $\hat{D}$ is the vector of the estimated symbols for the different users according to the Wiener-Hopf equation:

$$\hat{D} = R_{DY} R_{YY}^{-1} Y = (R_{DD} A^H)(A R_{DD} A^H + \sigma_b^2 . I_N)^{-1} Y \tag{4}$$

where $R_{DY}$, $R_{YY}$, $R_{DD}$ are respectively the covariance matrix of Y and D and the autocovariance matrices of Y and D. If it is assumed that the transmitted symbols $d_k$ are decorrelated, this gives $R_{DD} = I_N$ and therefore:

$$\hat{D} = A^H (AA^H + \sigma_b^2 . I_N)^{-1} Y \tag{5}$$

Since $A^H = V^H C^H H^H$ it is deduced from (5) that the equalization matrix Q can be put in the form:

$$Q = H^H (AA^H + \sigma_b^2 . I_N)^{-1} \tag{6}$$

As indicated by (6), the equalization operation depends on the calculation of the matrix $AA^H$ and the inversion of the matrix $AA^H + \sigma_b^2 . I_N$ (or equivalently the resolution of a linear system of rank N). These calculations consume resources of the mobile terminal, all the more so if they have to be performed frequently, notably in the case of rapid variations on the transmission channel. However, it is known that the resources of the terminals constitute precisely the critical part of a mobile telecommunication system.

The problem at the basis of the present invention is to propose a GMMSE equalization method for a downlink channel of an MC-CDMA telecommunication system which does not use significant calculation resources.

This problem is resolved by the invention defined as an equalization method for a downlink channel in a telecommunication system transmitting MC-CDMA symbols on a plurality of carrier frequencies, in which a plurality of links are established between a transmitter and a plurality of receivers in order to transmit a plurality of coded signals, each link using a distinct access code amongst N possible codes, and in which, for at least one receiver, a vector (Y) representing the components of the signal received by the receiver on the different carrier frequencies is subjected to a filtering step adapted for supplying an observable vector (Z, Z') and the said observable vector is used for effecting an estimation of the said transmitted symbols according to a mean square error minimisation criterion.

Advantageously, the said estimation comprises the calculation of the matrix $A^H A + \sigma_b^2 I_N$ with A=HCV where H is a matrix giving the characteristics of the transmission channel at the different carrier frequencies, C is the matrix of the possible codes, V is a diagonal matrix giving the transmission levels of the coded signals by means of the said N possible codes, $\sigma_b^2$ is the noise variance and $I_N$ is the unity matrix of size N×N. The said estimation can comprise a step of resolving a system of linear equations $\Omega \hat{D} = Z$ where $\Omega = A^H A + \sigma_b^2 I_N$, Z is the said observable vector and $\hat{D}$ is the vector of the symbols estimated for the different links.

According to one embodiment, the matrix $B = C^H |H|^2 C$ is calculated where C is the matrix of the possible codes and H is a matrix giving the characteristics of the transmission channel at the different carrier frequencies.

It is possible to select, from the transmission levels, real or estimated, of the signals coded by means of the said N possible codes, one subset of codes amongst the N possible codes. In this case, the matrix B can advantageously be reduced to a matrix B' of size P×P by retaining only the P rows and P columns corresponding to the selected codes, and the matrix C of the possible codes to a matrix C' of size N×P by retaining only the P columns corresponding to the selected codes. The matrix will then be calculated in the form $B' = C'^H |H|^2 C'$ where H is a matrix giving the characteristics of the transmission channel of the different carrier frequencies.

If P codes amongst N are selected, the matrix $V = \text{Diag}(v_0, \ldots, v_{N-1})$, where the $v_i$ values are the real or estimated values, can be reduced to a matrix V' of size P×P now containing only the levels associated with the said selected codes, the said estimation comprising a step of calculating the matrix $\Omega'=V'^H B'V'+\sigma_b^2.I_P$ where $\sigma_b^2$ is the variance of the noise on each carrier and $I_P$ is the unity matrix of size P×P. In this case, the said estimation can comprise a step of resolving a system of linear equations $\Omega' \hat{D}'=Z'$, where $Z'$ is the reduction of the observable vector Z to the P components corresponding to the codes selected and where $\hat{D}'$ is the vector of the symbols estimated on the different links using the said selected codes.

The invention is also defined by an equalization device for a telecommunication system receiver of the MC-CDMA type, comprising means for implementing the equalization method as disclosed above. Finally, the invention concerns a receiver for a telecommunication system of the MC-CDMA type comprising such an equalization device.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF INVENTION

Figure 1:
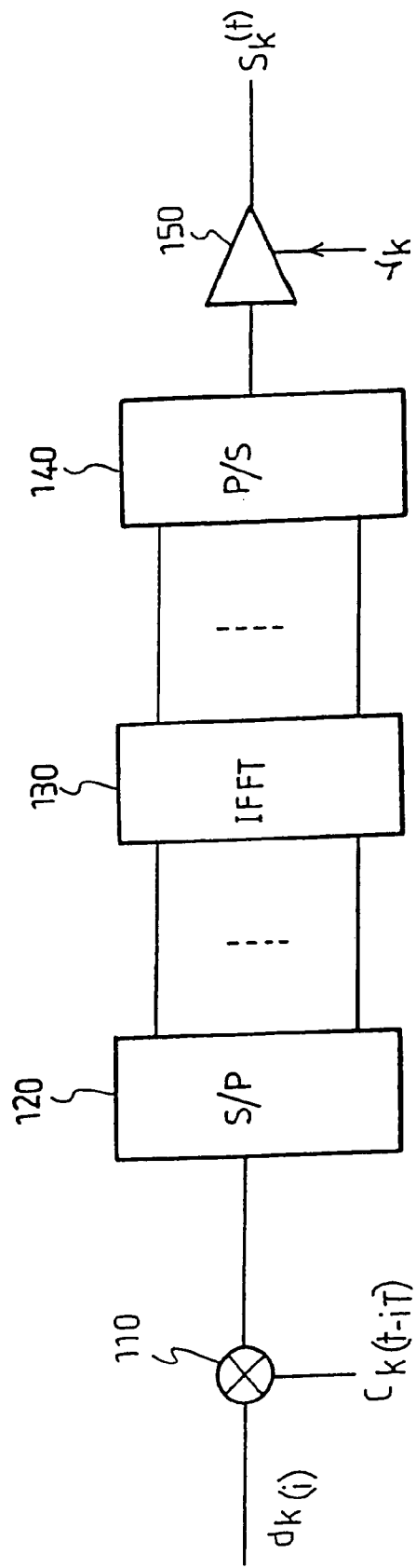
FIG. 1 depicts schematically the structure of an MC-CDMA transmitter known from the state of the art.
Figure 2:
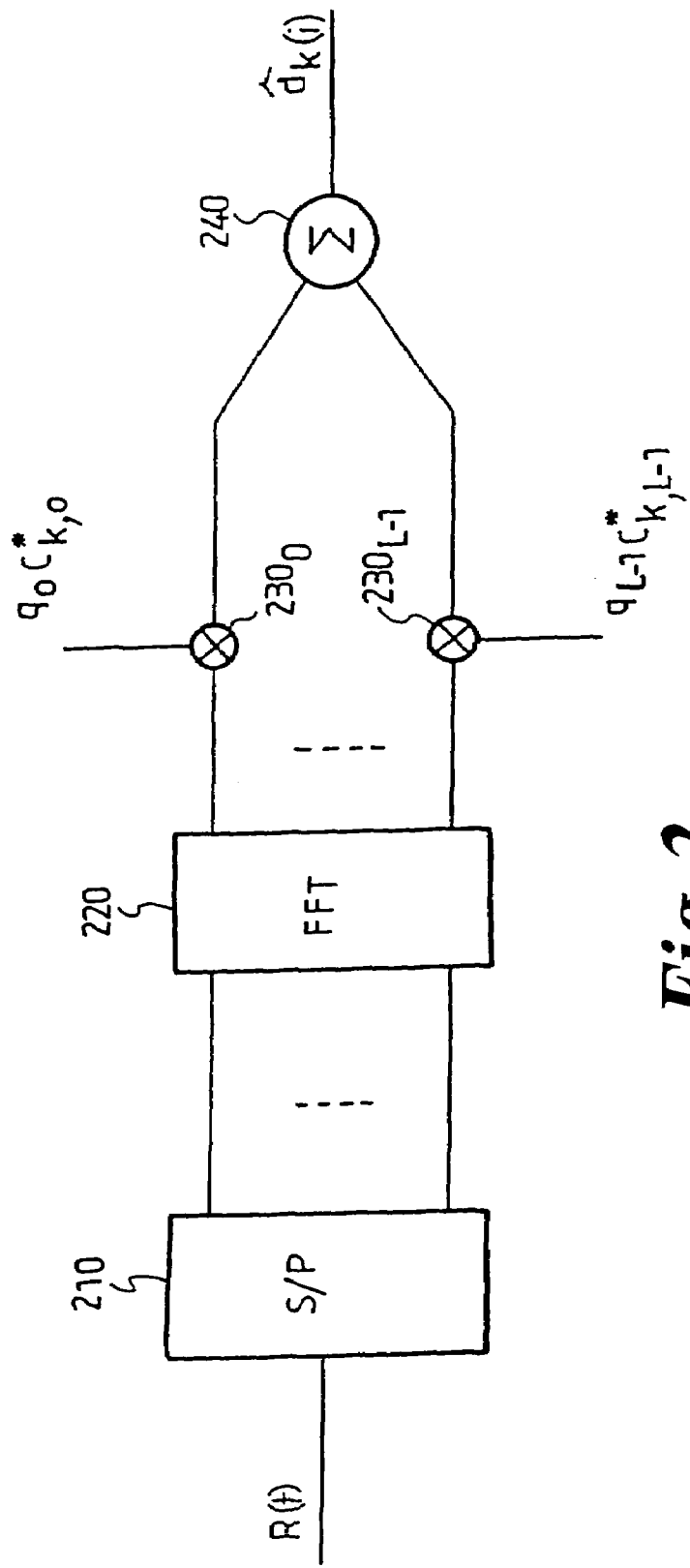
FIG. 2 depicts schematically the structure of a single user MC-CDMA receiver known from the state of the art.
Figure 3:
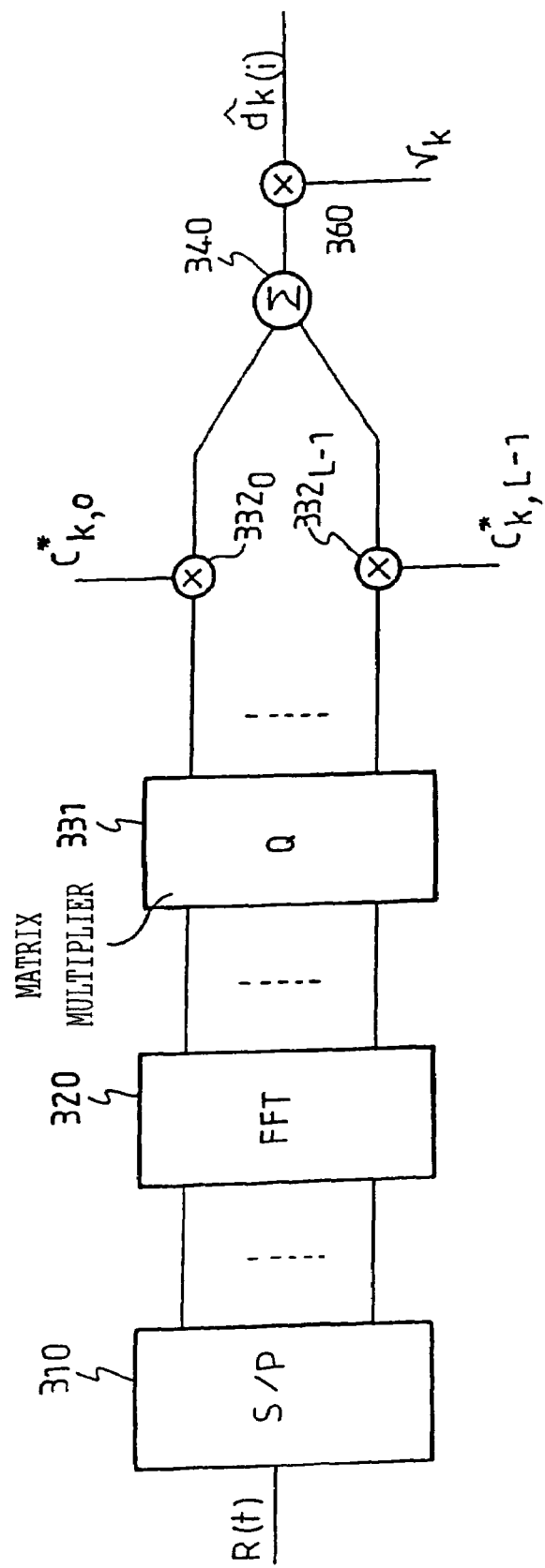
FIG. 3 depicts schematically the structure of an MC-CDMA receiver using a per user MMSE equalization, known from the state of the art.

A first idea for simplifying the equalization operation is to take advantage of the fact that the system does not generally work at full load. When the number P of users actually present is less than the number N of possible codes, a matrix V' of size P×P is constructed, obtained from the matrix V by eliminating the elements relating to the unused codes. It can be assumed, without loss of generality, that these codes bear the indices $0, \ldots P-1$, and hence $V'=\text{Diag}(v_0, \ldots, v_{P-1})$. The matrix C can also be reduced to a matrix C' of size N×P containing only the columns which correspond to the codes used. The matrix A, the product of the matrices H, C and V, is then also reduced to a matrix A' of size N×P: $A'=HC'V'$ and the vector Y is written: $Y=A'D'+b$ where D' is the vector D reduced to the components corresponding to the P users present.

Equation (5) can then be put in the form:

$$\hat{D}'=A'^H(A'A'^H+\sigma_b^2.I_N)^{-1}Y \quad (7)$$

However, equation (7) unfortunately does not afford any substantial simplification of the calculations since it involves the matrix $A'A'^H$, which is still of size N×N although A' is of reduced size N×P. The size of the matrix to be inverted (or equivalently the rank of the system of linear equations to be resolved) is therefore still a function of the number N of possible codes, that is to say still a function of the maximum number of users which the system can support.

It was assumed up to now that a user used only one code. In more general terms, the assumption will be made that a plurality of links can be established between the transmitter and a user, each link employing a distinct code. According to this definition, a transmission channel between the transmitter and a user can support several links. Thus N becomes the maximum number of links which can be authorised by the system and P is the number of links actually established.

The general idea at the basis of the invention is to find a formulation of the equalization operation capable of simplification when the number P of links (of codes used) is less than the maximum number N.

Consider the vector Y output from the FFT, it has been seen that $Y=AD+b$ where D is the vector of the symbols to be estimated. Let $Z=A^H Y$ be the result of the matched filtering of Y: it is known that Z is an exhaustive summary of Y. It is possible to take as an observable the vector Z instead of Y and estimate the vector D from this observable by means of a Wiener filtering. The estimated vector $\hat{D}$ is therefore written:

$$\hat{D}=R_{DZ}R_{ZZ}^{-1}Z \quad (8)$$

However $R_{DZ}=E(DY^H A)=(R_{DD}A^H+R_{Db})A=A^H A$ and likewise $R_{ZZ}=A^H A R_{DD} A^H A+A^H R_{bb} A=(AA^H+\sigma_b^2 I_N)A^H A$ from which $$\hat{D}=(A^H A+\sigma_b^2 I_N)^{-1}Z=(A^H A+\sigma_b^2 I_N)^{-1}A^H Y \quad (9)$$

When the system is not working at full load, it is possible to reduce the matrix A to a matrix A' and to rewrite equation (9) in the reduced form:

$$\hat{D}=(A'^H A'+\sigma_b^2 I_P)^{-1}A'^H Y \quad (10)$$

where $I_P$ is the unity matrix of size P×P.

It will be noted that this new estimation formula now requires only the inversion of a matrix of size P×P (or equivalently the resolution of a linear system of P equations with P unknowns) instead of a matrix of size N×N as before. The estimation of the symbols is considerably simplified thereby, all the more so when the load on the system is lower.

It will now be shown that, according to one embodiment of the invention, the calculation of the matrix $A'^H A'$ appearing in equation (10) can be simplified further when the matrix of the code C has certain properties. In fact, consider first of all the matrix $A^H A$. This can also be expressed as:

$$A^H A=V^H(C^H H^H HC)V=V^H(C^H|H|^2 C)V=V^H BV \quad (11)$$

where $B=C^H|H|^2 C$.

Assume first of all that the code used is a Walsh-Hadamard (WH) code. It will be recalled that the WH code can be generated like the columns of a matrix $C_{2p}$ obtained by recurrence:

$$C_{2p}=\begin{bmatrix} C_p & C_p \\ C_p & -C_p \end{bmatrix} \quad \text{and} \quad C_1=[1] \quad (12)$$

The matrix is real, symmetrical and equal to its own inverse. In addition, the sequences are orthogonal.

The elements of C can be expressed in the form: $c_{ij}=(-1)^{<i,j>}$ where $<i,j>$ is the scalar product of the binary representations of i and j:

$$\langle i, j \rangle = \sum_k i_k j_k$$

The following property is derived therefrom:

$$c_{ki}^* c_{kj} = c_{k,i \oplus j} \quad (13)$$

where $i \oplus j$ represents the bitwise addition of the integers i and j.

This is because:

$$\sum_n i_n k_n + \sum_n j_n k_n = \sum_n (i_n + j_n) k_n = \sum_n (i \oplus j)_n k_n$$

and therefore $\langle k,i \rangle + \langle k,j \rangle = \langle k, i \oplus j \rangle$.

The result of (13) is that the conjugate product of two WH codes is still a WH code.

Assume now that the codes used are Fourier codes, defined by: $c_{i,k} = \exp(-j\, 2\pi i k/N)$. The matrix of the code is symmetrical.

$$c^*_{k,i} c_{k,j} = c_{k,j-i} \quad (14)$$

where "j−i" designates here the subtraction modulo N.

The result here too is that the combined product of two Fourier codes is still a Fourier code.

This property can be extended to a family of codes obtained by "rotation" of the previous codes (and for this reason referred to as rotated codes) as presented in the article by A. Bury et al. entitled "Diversity comparison of spreading transforms for multi-carrier spread spectrum transmission methods" published in Electronic Wireless 2000 Proceedings, Dresden, Germany. The matrix of a rotated code is defined by:

$$C^r = C \cdot D(r) \quad (15)$$

where D is a diagonal matrix defined by the vector $r = (r_0, \ldots, r_{N-1})^T$ that is to say $D = \text{Diag}(r_0, \ldots, r_{N-1})$ where $r_i = \exp(j\phi_i)$.

It is important to note that coding N symbols intended for N users by means of the matrix of a rotated code is equivalent to effecting a rotation of each of these symbols through an angle $\phi_i$ and then applying the matrix of the initial code. In other words, a rotated code of an initial code can boil down to the initial code at the cost of a rotation of the constellation for each of the users.

If the matrix C of the initial code relates to a Fourier code, then, for the rotated Fourier code:

$$c_{k,i}^{r*} c_{k,j}^r = r_i^* \cdot c_{k,i}^* \cdot r_j \cdot c_{k,j} = \exp(\phi_j - \phi_i) \cdot c_{k,j-i} = \lambda_{ij} c_{k,j-i}^r \quad (16)$$

with $\lambda_{ij} = \phi_j - \phi_i - \phi_{j-i}$

Likewise, for a rotated Hadamard code:

$$c_{k,i}^{r*} c_{k,j}^r = r_i^* \cdot c_{k,i}^* \cdot r_j \cdot c_{k,j} = \exp(\phi_j - \phi_i) \cdot c_{k,j \oplus i} = \lambda_{ij} c_{k,j \oplus i}^r \quad (17)$$

with $\lambda_{ij} = \phi_j - \phi_i - \phi_{j \oplus i}$

Subsequently, the codes satisfying the following property will be considered:

$$c_{k,i}^* c_{k,j} = \lambda_{ij} c_{k,f(i,j)} \text{ or } \lambda_{ij} c_{k,f(i,j)}^* \text{ which will be denoted } \lambda_{ij} \cdot c_{k,f(i,j)}^{(*)} \quad (18)$$

where f(i,j) is an index dependent on i and j and describing 0 to N−1 with i constant or with j constant and where $\lambda_{ij}$ is a complex number in general depending on the indices i and j.

In this case the coefficients $b_{ij}$ of the matrix $B = C^H |H|^2 C$ can be expressed by:

$$b_{ij} = \sum_{k=0}^{N-1} |h_k|^2 c_{k,i}^* c_{k,j} = \lambda_{ij} \sum_{k=0}^{N-1} |h_k|^2 c_{k,f(i,j)}^{(*)} \quad (19)$$

First of all, for example, the first row of the matrix B is calculated, that is to say the coefficients $b_{0j}$, and then the other rows are derived therefrom by permutation and multiplication:

$$b_{ij} = \frac{\lambda_{ij}}{\lambda_{o,j}} b_{0, f_0^{-1}(f(i,j))}^{(*)} \text{ where } f_0(k) = f(0, k) \quad (20)$$

If a table of $f_0^{-1} f$ and, where applicable, of $\lambda_{ij}/\lambda_{o,j}$, is available, calculation of the matrix B requires only the calculation of one of its rows. By way of example, expression (20) is written in the case of a WH code: $b_{ij} = b_{0, i \oplus j}$.

If for example use is made of a WH code, a rotated WH code, a Fourier code or a rotated Fourier code, the first row of the matrix B can advantageously be obtained by simple transform of the vector $\rho = (|h_0|^2, \ldots, |h_{N-1}|^2)^T$.

This is because, in the case of a WH code, the first row is obtained by Hadamard transform of $\rho$:

$$b_{0,j} = \sum_{k=0}^{N-1} |h_k|^2 c_{k,0}^* c_{k,j} = \sum_{k=0}^{N-1} |h_k|^2 c_{k,0 \oplus j} = \sum_{k=0}^{N-1} |h_k|^2 c_{k,j} = \sum_{k=0}^{N-1} c_{j,k} |h_k|^2 \quad (21)$$

and, in the case of a Fourier code, the first row is obtained by Fourier transform of $\rho$:

$$b_{0,j} = \sum_{k=0}^{N-1} |h_k|^2 c_{k,0}^* c_{k,j} = \sum_{k=0}^{N-1} |h_k|^2 c_{k,j-0} = \sum_{k=0}^{N-1} |h_k|^2 c_{k,j} = \sum_{k=0}^{N-1} c_{j,k} |h_k|^2 \quad (22)$$

Advantageously, the Fourier transform will be effected by means of an FFT.

If rotated versions of these codes are used, the coefficients of the first row of B are derived from (21) and (22) by means of a simple multiplication by complex coefficient.

In general terms, if the code employed satisfies property (18), notably for a Hadamard, rotated Hadamard, Fourier or rotated Fourier code, advantageously a row of the matrix B will be calculated (or a column since it is hermitian) and the other rows (or respectively the other columns) will be deduced therefrom by means of permutation and where necessary multiplication operations.

Consider now the matrix $A'^H A'$ appearing in the estimation calculation (10). The matrix A' can also be written $A' = (HC)' V'$ where $(HC)'$ is the reduction of the matrix HC to its first P columns. A first expression of $A'^H A'$ is deduced therefrom:

$$A'^H A' = V'^H (C^H |H|^2 C)' V' = V'^H B' V' \quad (23)$$

According to this variant, first of all the matrix $B=C'^H|H|^2C$ is calculated using the simplified method, disclosed above, and then the reduction in dimension is carried out.

Alternatively, the matrix $A'^H A'$ can be obtained directly from $A'=HC'V'$. A second expression of $A'^H A'$ is derived therefrom:

$$A'^H A' = V'^H (C'^H |H|^2 C') V' \quad (24)$$

According to this variant, first of all the matrix of the codes C is reduced, and then matrix $C'^H|H|^2C'$ is calculated.

When the number of codes P is small, the calculation of $A'^H A'$ according to formula (24) will be opted for. This calculation results in approximately $(NP^2+2P^2+NP)$ operations.

If, on the other hand, the reduction in the number of codes is not very great, the calculation according to formula (23) will be opted for, in so far as there exists a fast algorithm for the application of the transform C. This calculation is all the more simple since, in the majority of cases, the codes of the matrix C satisfy property (18). If use is made for example of a WH code, the first row of the matrix B is obtained by a Hadamard transform of the vector $\rho=(|h_0|^2, \ldots, |h_{N-1}|^2)^T$ requiring $N\log_2(N)$ operations. The complete calculation of $A'^H A'$ requires $(N\log_2(N)+2P^2)$ operations. This operation will therefore be more effective if $\log_2(N)$ is smaller than $P^2$. This conclusion also applies when the code used is a Fourier code.

Advantageously, it is possible to pass dynamically from the calculation of $A'^H A'$ according to (23) to the calculation according to (24) and vice-versa, depending on the value of P.

It was assumed up to now that the reduction of the matrices consisted of being limited to the components relating to the codes used. In fact, a more extensive reduction can be obtained on the basis of one of the following criteria:

(I) the P-1 (P a given integer such that P<N) codes $c_m$ distinct from $c_k$ associated with the highest levels $v_m$ are selected. This is because the high transmission level signals have a higher jamming potential than the others;

(II) the codes $c_m$ distinct from $c_k$ associated with the levels $v_m>Th$ where Th is a predetermined threshold, are selected. Advantageously, the threshold Th will be adaptive and will depend on the transmission level for the user in question. Then the codes $c_m$ will be selected such that: $v_m>\mu v_k$ with, for example, $0<\mu<1$. If the receiver of the user k uses several codes of indices $k_1, \ldots, k_\Delta$, that is to say if the user has established several links with the base station (the channel of a user then consists of several links), account will be taken of the code of index $k_\delta \in \{k_1, \ldots, k\Delta\}$ associated with the lowest level $v_{k\delta}$ in and the codes $c_m$ will be selected such that: $v_m>\mu.v_{k\delta}$.

Naturally, a combination of the above criteria can also be envisaged. Furthermore, in addition to the selection from the transmission levels, it is possible to select, from amongst those adopted according to this criterion, only the most intrinsically jamming codes (that is to say excluding any consideration of transmission level) for the code in question. This is because it is known, for example from the article by D. Mottier and D. Castelain entitled 'spreading sequence allocation procedure for MC-CDMA transmission systems', published in VTC' Fall 2000, September 2000 and included here by reference, that, if the coefficients $h_k$ of the channel are correlated, for a given user code, certain codes, for equal transmission levels, are more jamming than others. More precisely, the interference between two codes $c_i$ and $c_j$ is related to the properties of the "product" sequence $w_{ij}$, defined by $w_{ij}[k]=c_i[k]c_j^*[k]$. This selection criterion will be referred to as the intrinsic jamming criterion.

Figure 5:
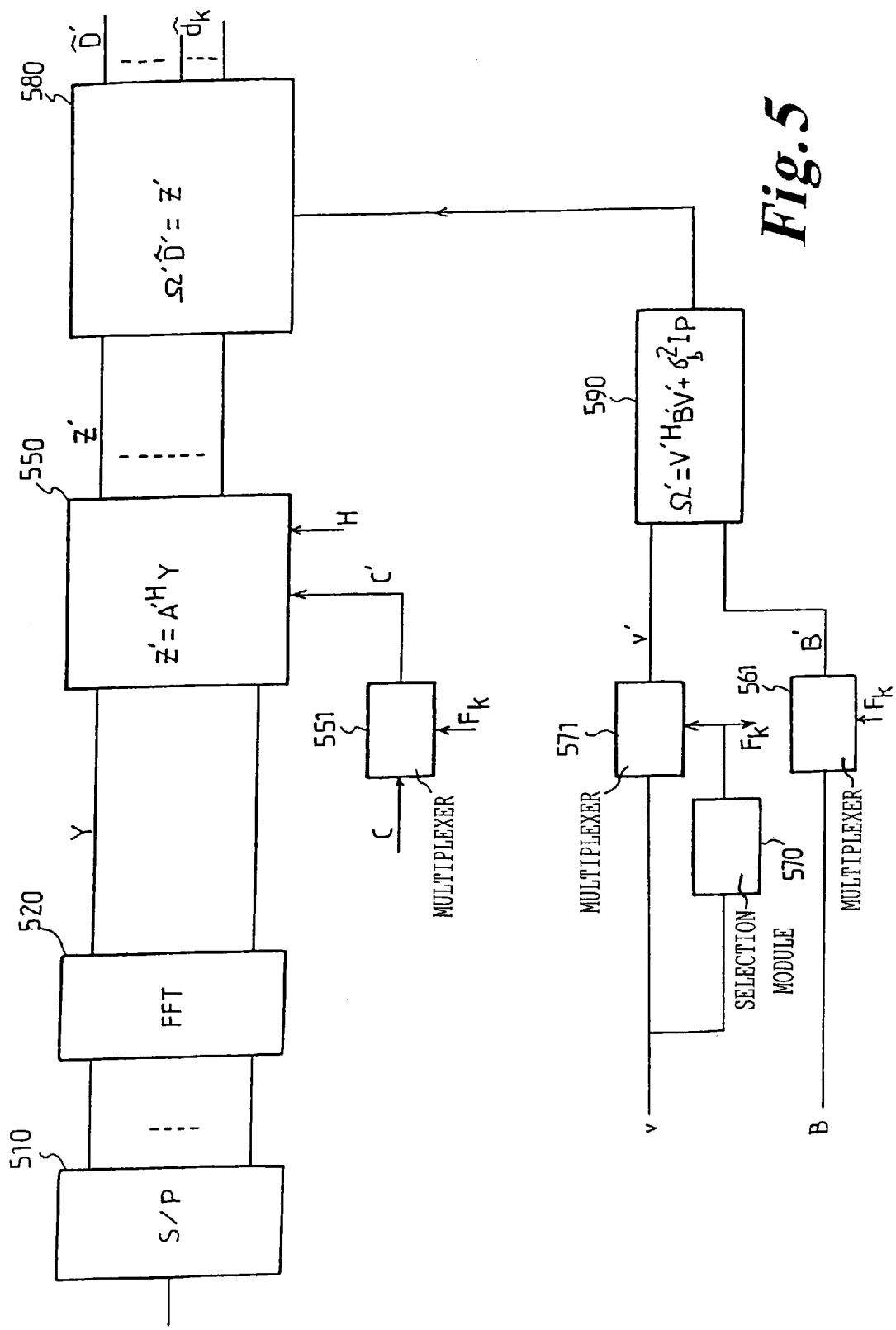
FIG. 5 depicts schematically the structure of an MC-CDMA receiver using an equalization method according to a first embodiment of the invention.

FIG. 5 illustrates a GMMSE equalizer according to a first embodiment of the invention.

Figure 4:
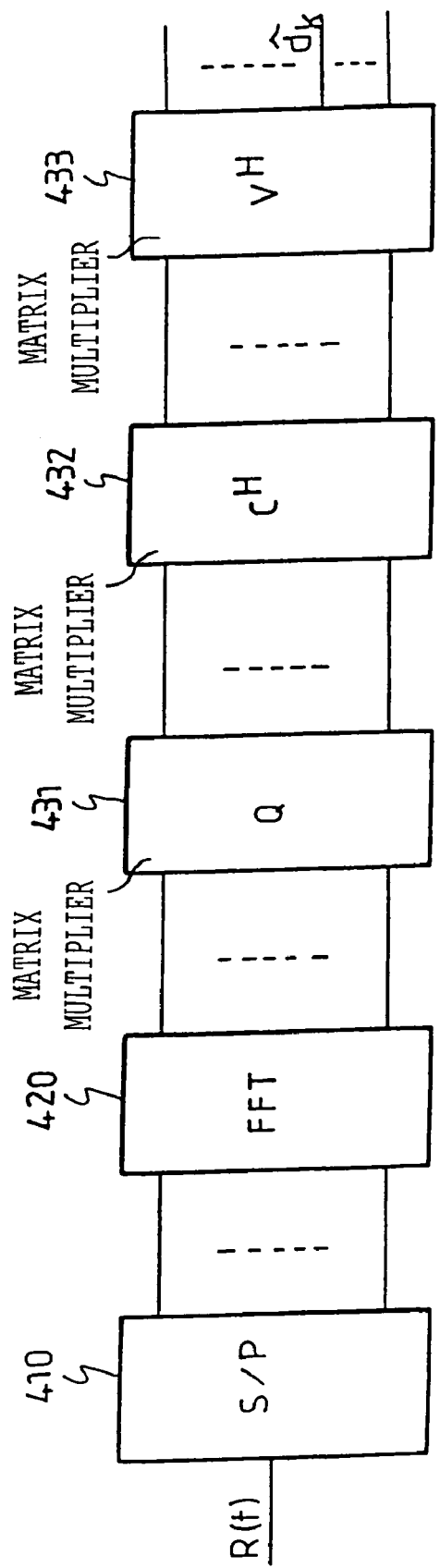
FIG. 4 depicts schematically the structure of an MC-CDMA receiver using a GMMSE equalization, known from the state of the art.

The modules 510, 520 are identical to the modules 410 and 420 of FIG. 4. The vector $v=(v_0, \ldots, v_{N-1})^T$ of the transmission levels, received or estimated by the receiver of the user k in question, is submitted at 570 to a selection module using a selection criterion according to (I) or (II), possibly in combination with the intrinsic jamming criterion. The selection module 570 determines a set $F_k \subset \{0, \ldots, N-1\}$ of code indices to be selected and transmits it to the multiplexers 551, 561 and 571. The multiplexer 571 selects the components of v relating to the indices of $F_k$ in order to supply the vector of reduced size v'. Likewise, the multiplexers 551 and 561 supply respectively the matrices of reduced size B' and C. The module 550 is an adapted filter supplying $Z'=A'^H Y$. It should be noted that, strictly speaking, the expression "adapted filtering" is suited only to the case where the selection contains all the indices of the codes used. It will be extended to the case where the weakly interfering codes are not selected. The matrix calculation module 590 then calculates the matrix $\Omega'=V'^H B'V'+\sigma_b^2.I_P$ and transmits it to the estimation module 580. The latter resolves the linear system of P equations with P unknowns $\hat{d}_k$: $\Omega'\hat{D}'=Z'$.

Figure 6:
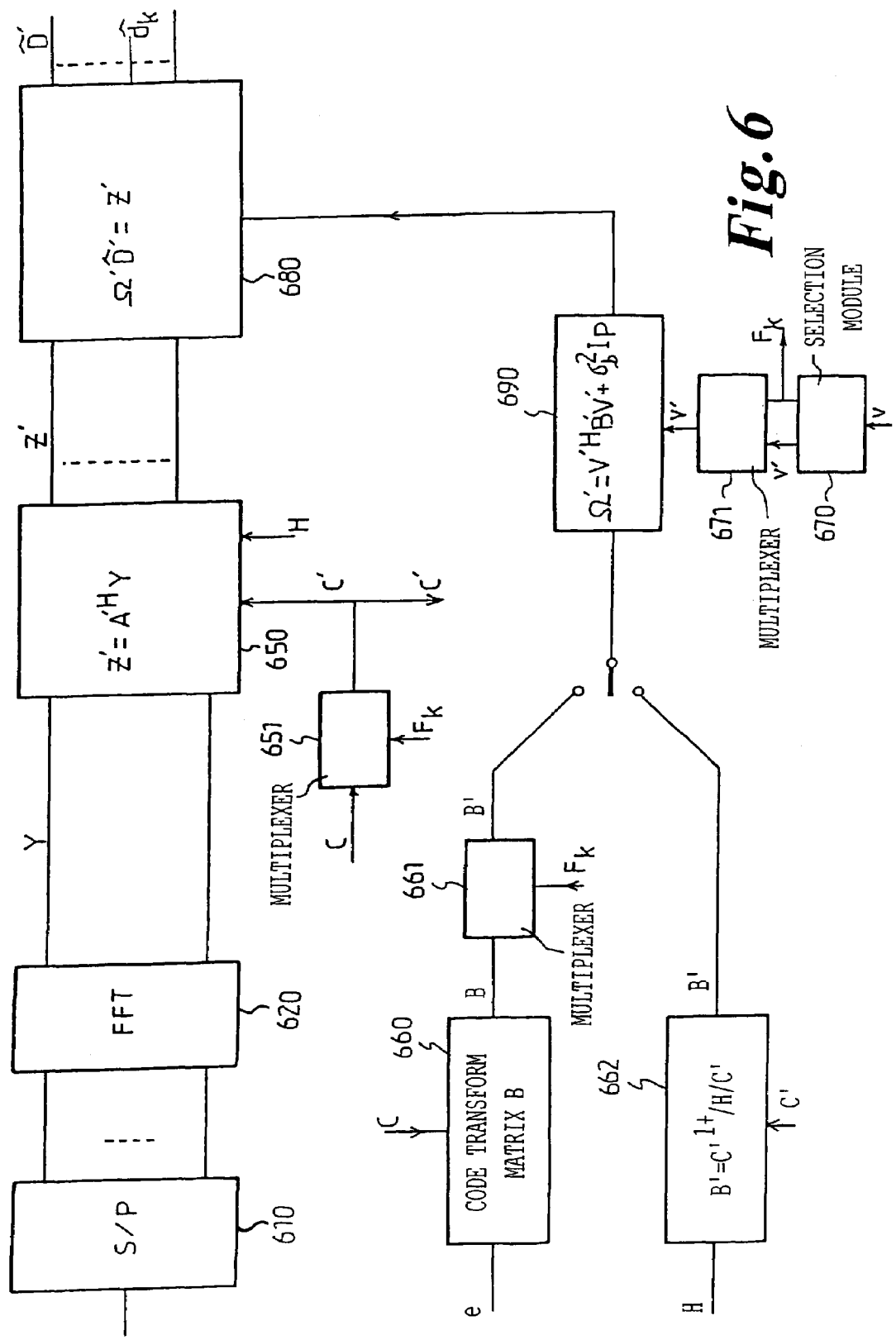
FIG. 6 depicts schematically the structure of an MC-CDMA receiver using an equalization method according to a second embodiment of the invention.

FIG. 6 illustrates a GMMSE equalizer according to a second embodiment of the invention.

The modules 610, 620, 650, 651, 661, 670, 671, 680, 690 are respectively identical to the modules 510, 520, 550, 551, 561, 570, 571, 580, 590 in FIG. 5.

As before, the module 650 effects an adapted filtering on the vector Y and supplies the vector $Z'=A'^H Y$. The equalizer here comprises two possible branches for calculating B' according to the value of P:

If $P^2>\log_2 N$, the calculation is effected in the upper branch comprising the modules 660 and 661. The vector $\rho=(|h_0|^2, \ldots, |h_{N-1}|^2)^T$ issuing from a channel estimator is subjected at 660 to a transform (Hadamard or Fourier) corresponding to the code used for supplying the first row of the matrix B. Then, using a table giving the permutation of the indices $f_0^{-1}f$, the module 660 generates, by means of (20), the other rows of the matrix B. The multiplexer 661 next reduces the matrix B to a matrix B' of size P×P according to the set $F_k$ of indices to be selected, supplied by the selection module 670.

On the other hand, if $P^2 \leq \log_2 N$, the calculation is effected in the lower branch. The module 662 receives from the module 651 the reduced matrix C' and directly calculates the matrix B' according to $B'=C'^H|H|^2C'$. The matrix calculation module 690 receives the vector of reduced size v' from the multiplexer 671 and the matrix B' of the upper branch or of the lower branch, according to circumstances. It calculates the matrix $\Omega'=V'^H B'V'+\sigma_b^2.I_P$ and transmits it to the module 680. The latter then resolves the linear system of P equations with P unknowns $\hat{d}_k$: $\Omega'\hat{D}'=Z'$.

Although the MC-CDMA reception device using the equalization method according to the invention has been depicted in the form of functional modules, it goes without saying that all or part of this device can be implemented by means of a single processor either dedicated or programmed for fulfilling all the functions described or in the form of a plurality of processors either dedicated or programmed for each fulfilling some of the said functions.

The invention claimed is:

1. An equalization method for a downlink channel in a telecommunication system transmitting MC-CDMA symbols on a plurality of carrier frequencies, comprising the steps of:
   establishing a plurality of links between a transmitter and a plurality of receivers in order to transmit a plurality of coded signals, each link using a distinct access code amongst N possible codes;
   receiving the plurality of coded signals at one or more of the plurality of receivers;
   performing equalization relative to the received plurality of coded signals using at least one matrix formed as a function of an actual number P of links formed, where P is less than N; and
   estimating transmitted symbols according to a mean square error minimization criterion.

2. The equalization method according to claim 1, wherein the matrix is at least one of a matrix H giving the characteristics of a transmission channel at the different carrier frequencies, a matrix C of the possible codes, and a diagonal matrix V giving the transmission levels of the signals coded by means of the said N possible codes.

3. The equalization method according to claim 1, wherein a matrix $B = C^H |H|^2 C$ is calculated where $^H$ designates a conjugate transpose, C is the matrix of possible codes, and H is a matrix giving characteristics of a transmission channel at the different carrier frequencies.

4. The equalization method according to claim 3, wherein the matrix B is reduced to a matrix B' of size P×P by retaining only the P rows and P columns corresponding to the codes selected.

5. The equalization method according to claim 2, wherein the matrix C of the possible codes is reduced to a matrix C' of size N×P by retaining only P columns corresponding to the codes selected.

6. The equalization method according to claim 3, wherein the matrix $B' = C'^H |H|^2 C'$ is calculated, where $^H$ designates a conjugate transpose and the matrix C of the possible codes is reduced to a matrix C' of size N×P by retaining only P columns corresponding to the codes selected.

7. The equalization method according to claim 6, wherein P codes amongst the N codes are selected, a matrix V=Diag $(v_0, \ldots, v_{N-1})$, where $v_i$ values are real or estimated levels, is reduced to a matrix V' of size P×P containing only the levels associated with the selected codes, the step of estimating comprising a step of calculating the matrix $\Omega' = V'^H B' V' + \sigma_b^2 I_p$ where $\sigma_b^2$ is variance of noise on each carrier, $^H$ designates a conjugate transpose, and $I_p$ is a unity matrix of size P×P.

8. The equalization method according to claim 7, wherein the step of estimating comprises a step of resolving a system of linear equations $\Omega' \{\hat{D}\}' = Z'$ where Z' is a reduction of an observable vector Z to P components corresponding to the selected codes and where $\{\hat{D}\}'$ is a vector of the symbols estimated on the different links using said selected codes.

9. An equalization device for a receiver in a telecommunication system of the MC-CDMA type, comprising:
   means for implementing the equalization method according to claim 1.

10. Receiver for a telecommunication system of the MC-CDMA type, comprising:
    the equalization device according to claim 9.

* * * * *